(12) United States Patent
Fujiwara

(10) Patent No.: US 9,399,439 B2
(45) Date of Patent: Jul. 26, 2016

(54) VEHICLE SIDE AIR BAG DEVICE

(71) Applicant: TOYOTA JIDOSHA KABUSHIKI KAISHA, Toyota-shi, Aichi-ken (JP)

(72) Inventor: Yusuke Fujiwara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/415,911

(22) PCT Filed: Jun. 13, 2013

(86) PCT No.: PCT/JP2013/066397
§ 371 (c)(1),
(2) Date: Jan. 20, 2015

(87) PCT Pub. No.: WO2014/017210
PCT Pub. Date: Jan. 30, 2014

(65) Prior Publication Data
US 2015/0166003 A1    Jun. 18, 2015

(30) Foreign Application Priority Data

Jul. 23, 2012   (JP) .................................. 2012-162721

(51) Int. Cl.
| | |
|---|---|
| *B60R 21/207* | (2006.01) |
| *B60R 21/231* | (2011.01) |
| *B60R 21/2338* | (2011.01) |
| *B60R 21/237* | (2006.01) |
| *B60R 21/26* | (2011.01) |

(52) U.S. Cl.
CPC ......... *B60R 21/23138* (2013.01); *B60R 21/207* (2013.01); *B60R 21/237* (2013.01); *B60R 21/2338* (2013.01); *B60R 21/26* (2013.01); *B60R 2021/23146* (2013.01); *B60R 2021/23386* (2013.01)

(58) Field of Classification Search
CPC ............ B60R 21/207; B60R 21/23138; B60R 2021/23146
See application file for complete search history.

(56) References Cited

U.S. PATENT DOCUMENTS

| | | | |
|---|---|---|---|
| 5,794,971 A | 8/1998 | Boydston et al. | |
| 2009/0200776 A1* | 8/2009 | Sato et al. ................... | 280/730.2 |
| 2010/0244412 A1* | 9/2010 | Yamashita .................. | 280/728.3 |

FOREIGN PATENT DOCUMENTS

| | | |
|---|---|---|
| DE | 102005051043 A1 | 5/2007 |
| GB | 2322338 A | 8/1998 |
| JP | 2001-163162 A | 6/2001 |
| JP | 2009-035089 A | 2/2009 |
| JP | 2011-140269 A | 7/2011 |

* cited by examiner

*Primary Examiner* — Faye M Fleming
(74) *Attorney, Agent, or Firm* — Oliff PLC

(57) ABSTRACT

In a vehicle side air bag device, an air bag is fixed to a side frame portion of a seatback frame via an inflator at a fixed part set in a rear end of a vertically intermediate part. An upper insertion portion into which an upper end of a reaction plate is inserted is formed on an upper-part side in a rear end of the air bag, and a lower insertion portion into which a lower end of the reaction plate is inserted is formed on a lower-part side in the rear end of the air bag. The reaction plate is modularized with the air bag, the inflator, and so on, and is fixed to the side frame portion via the inflator.

8 Claims, 6 Drawing Sheets

VEHICLE SIDE AIR BAG DEVICE

TECHNICAL FIELD

The present invention relates to a vehicle side air bag device.

BACKGROUND ART

A side air bag device described in Patent Document 1 includes a large-sized air bag that can restrain an occupant from a shoulder to a lumbar. The air bag is disposed in a door-side side portion of a seatback in a folded state. A lower side of the air bag is fixed to a door-side side frame of a seatback frame, and an upper end of the air bag is held by a clip attached to an upper part of the door-side side frame. The clip is configured to support the air bag from a seat rear side upon receipt of a reaction force from the door-side side frame to a seat front side at the time when the air bag is expanded and unfolded.

Examples of the prior art document related to the present invention include Patent Documents 2 to 3.

CITATION LIST

Patent Documents

Patent Document 1: Japanese Patent Application Publication No. 2011-140269 (JP 2011-140269 A)
Patent Document 2: Japanese Patent Application Publication No. 2009-035089 (JP 2009-035089 A)
Patent Document 3: Japanese Patent Application Publication No. 2001-163162 (JP 2001-163162 A)

SUMMARY OF THE INVENTION

Problem to be Solved by the Invention

In the vehicle side air bag device, at the time when the large air bag is expanded and unfolded, the clip can suppress unexpected swinging (flapping) of the upper end of the air bag in a front-rear direction. However, the upper end of the air bag is directly held by the clip in the upper part of the door-side side frame, so that there are restrictions to an attachment procedure of components with respect to the seatback frame. That is, when the air bag is attached to the seatback frame in a state where the seatback frame is covered with a seat pad and a seat skin from above, a clip or the like is inserted, from a lower side, between the door-side side frame and the seat pad and the clip is attached to the upper part of the door-side side frame, so that an attachment operation is complicated. In view of this, it is necessary to attach the air bag and the clip to the seatback frame earlier than the seat pad and the like, thereby resulting in that a degree of freedom of the attachment procedure decreases.

The present invention is achieved in consideration of the above fact, and is intended to obtain a vehicle side air bag device that is able to suppress flapping of an air bag at the time when the air bag is expanded and unfolded, and to improve the degree of freedom of the attachment procedure of components to a seatback frame.

Means for Solving the Problem

A vehicle side air bag device according to a first aspect of the present invention includes: a gas generator disposed in a side portion on an outer side, in a vehicle width direction, of a seatback of a vehicle seat and configured to be activated to generate gas for expansion and unfolding; an elongated member disposed in the side portion in a state where its longitudinal direction is along a height direction of the seatback; and an air bag disposed in a folded state in the side portion and fixed to a side frame portion of a seatback frame together with the gas generator and the elongated member, the air bag being expanded and unfolded toward a vehicle front side of the side portion when the gas is supplied thereinside, the air bag including an insertion portion provided on an upper side relative to a fixed part to the side frame portion and configured such that the elongated member is inserted therein.

In the first aspect, in the side portion on the outer side, in the vehicle width direction, of the seatback of the vehicle seat, the folded air bag is fixed to the side frame portion of the seatback frame together with the gas generator and the elongated member. The insertion portion in which the elongated member is inserted is formed in the air bag. The insertion portion is formed on the upper side relative to the fixed part of the air bag to the side frame portion. In view of this, at the time when the air bag is expanded and unfolded toward the vehicle front side of the side portion by the gas generated from the gas generator, not only the fixed part is supported by the side frame portion, but also the insertion portion is supported by the elongated member on the upper side relative to the fixed part. This makes it possible to suppress flapping of the air bag at the time when the air bag is expanded and unfolded.

Besides, at the time when the air bag is fixed to the side frame portion, the air bag, the gas generator, and the elongated member can be modularized in a state where the elongated member is inserted into the insertion portion in advance. When the module is fixed to the side frame portion, a fixing operation of the fixed part is just performed. Because of this, even in a state where the seatback frame is covered with a seat pad and the like, the fixing operation (an attachment operation) is easily performed. This makes it possible to improve a degree of freedom of an attachment procedure of components to the side frame portion.

Further, at the time when the elongated member is attached to the air bag so as to be modularized, the elongated member is just inserted into the insertion portion. This makes it possible to simplify an attachment operation of the elongated member to the air bag.

A vehicle side air bag device according to a second aspect of the present invention is configured such that: in the first aspect, the air bag includes an insertion portion provided on a lower side relative to the fixed part to the side frame portion and configured such that the elongated member is inserted therein.

In the second aspect, the air bag includes the insertion portions formed on upper and lower sides relative to the fixed part to the side frame portion, respectively, and the elongated member is inserted into the upper and lower insertion portions. Accordingly, at the time when the air bag is expanded and unfolded, the air bag is supported at three points, i.e., the fixed part and the upper and lower insertion portions, so that flapping of the air bag can be suppressed effectively.

A vehicle side air bag device according to a third aspect of the present invention is configured such that: in the first or second aspect, the insertion portion is formed by attaching a cloth to a base cloth constituting a body portion of the air bag, and the elongated member is inserted between the base cloth and the cloth.

Note that "attaching" in the third aspect includes "sewing," "bonding," "thermal welding," and so on.

In the third aspect, the insertion portion is formed by attaching the cloth to the base cloth constituting the body portion of the air bag, so that a configuration of the insertion portion can be simplified. Further, a configuration in which a slit or the like is formed in a base cloth so as to serve, as an insertion portion requires a treatment to prevent gas leakage from the slit or the like, but the present aspect does not require such a gas leakage prevention treatment, which is preferable.

A vehicle side air bag device according to a, fourth aspect of the present invention is configured such that: in any one of the first to third aspects, the elongated member has a reaction force surface facing a seat front side, so as to support the air bag from a seat rear side by the reaction force surface at the time when the air bag is expanded and unfolded.

In the fourth aspect, at the time when the air bag is expanded and unfolded, the air bag is supported by the reaction force surface provided in the elongated member from the seat rear side. The elongated member provided with the reaction force surface is elongated along the height direction of the seatback, so that a reaction force of the unfolding of the air bag can be supported in a wide range in the up-down direction. As a result, the air bag can be unfolded at an early stage.

A vehicle side air bag device according to a fifth aspect of the present invention is configured such that: in the fourth aspect, the elongated member includes a mounting portion superimposed on an outer side surface of the side frame portion in the vehicle width direction, and a reaction force receiving portion extending outwardly in the vehicle width direction from the mounting portion, the gas generator is accommodated in the air bag in the folded state in which the air bag is placed on an outer side of the mounting portion in the vehicle width direction and on a vehicle front side of the reaction force receiving portion, and a stud bolt included in the gas generator penetrates through the air bag, the mounting portion, and the side frame portion so as to be engaged threadedly with a nut.

In the fifth aspect, the mounting portion of the elongated member is superimposed on the outer side surface of the side frame portion in the vehicle width direction, and the stud bolt of the gas generator accommodated in the air bag in the folded state penetrates through the air bag, the mounting portion, and, the side frame portion so as to be engaged threadedly with the nut. Hereby, the air bag, the gas generator, and the elongated member can be fixed to the side frame portion by so-called side surface fastening. Further, the elongated member includes the reaction force receiving portion extending outwardly in the vehicle width direction from the mounting portion, and the reaction force receiving portion is placed on a vehicle rear side of the air bag in the folded state. Accordingly, a reaction force of the unfolding of the air bag can be supported with a vehicle front side surface of the reaction force receiving portion being taken as a reaction force surface.

A vehicle side air bag device according to a sixth aspect of the present invention is configured such that: the vehicle side air bag device of the fourth aspect further includes a bracket fixed to the side frame portion and extending toward an outer side in the vehicle width direction relative to the side frame portion, the elongated member is superimposed on a vehicle front side surface of the bracket, the gas generator is accommodated in the air bag in the folded state in which the air bag is placed on a vehicle front side of the elongated member, and a stud bolt included in the gas generator penetrates through the air bag, the elongated member, and the bracket so as to be engaged threadedly with a nut.

In the sixth aspect, the elongated member is superimposed on a vehicle front side surface of the bracket fixed to the side frame portion of the seatback frame. Further, the stud bolt of the gas generator accommodated in the air bag in the folded state penetrates through the air bag, the elongated member, and the bracket so as to be engaged threadedly with the nut. Hereby, the air bag, the gas generator, and the elongated member can be fixed to the side frame portion via the bracket by so-called back surface fastening. Further, since the elongated member is placed on the vehicle rear side of the air bag in the folded state, a reaction force of the unfolding of the air bag can be supported with a vehicle front side surface of the elongated member being taken as a reaction force surface.

A vehicle side air bag device according to a seventh aspect of the present invention is configured such that: in the fifth or sixth aspect, the elongated member is temporarily tacked to the side frame portion or the bracket such that a temporal tacking portion provided in the elongated member is engaged with the side frame portion or the bracket.

In the seventh aspect, at the time when a module including the air bag, the gas generator, and the elongated member is fixed to the side frame portion, the temporal tacking portion provided in the elongated member is engaged with the side frame portion or the bracket. Hereby, the elongated member, that is, the module can be temporarily tacked to the side frame portion or the bracket. As a result, it is possible to simplify an operation of side surface fastening or back surface fastening performed after that.

Advantageous Effects of Invention

As described above, the vehicle side air bag device according to the present invention is able to suppress flapping of an air bag at the time when the air bag is expanded and unfolded, and to improve a degree of freedom of an attachment procedure of components to a seatback frame.

MODES FOR CARRYING OUT THE INVENTION

First Embodiment

The following describes a vehicle side air bag device 10 (hereinafter, just referred to as the side air bag device 10) according to a first embodiment of the present invention with reference to FIGS. 1 to 3. Note that an arrow FR, an arrow UP, and an arrow OUT, which are shown appropriately in each figure, indicate a vehicle front direction (a traveling direction), a vehicle upper direction, and an outer side in a vehicle width direction, respectively. Hereinafter, in a case where a description is made by use of merely front and rear directions and up and down directions, they indicate front and rear of a vehicle front-rear direction, and up and down of a vehicle vertical direction, respectively, unless otherwise specified.

(Configuration)

Figure 1:
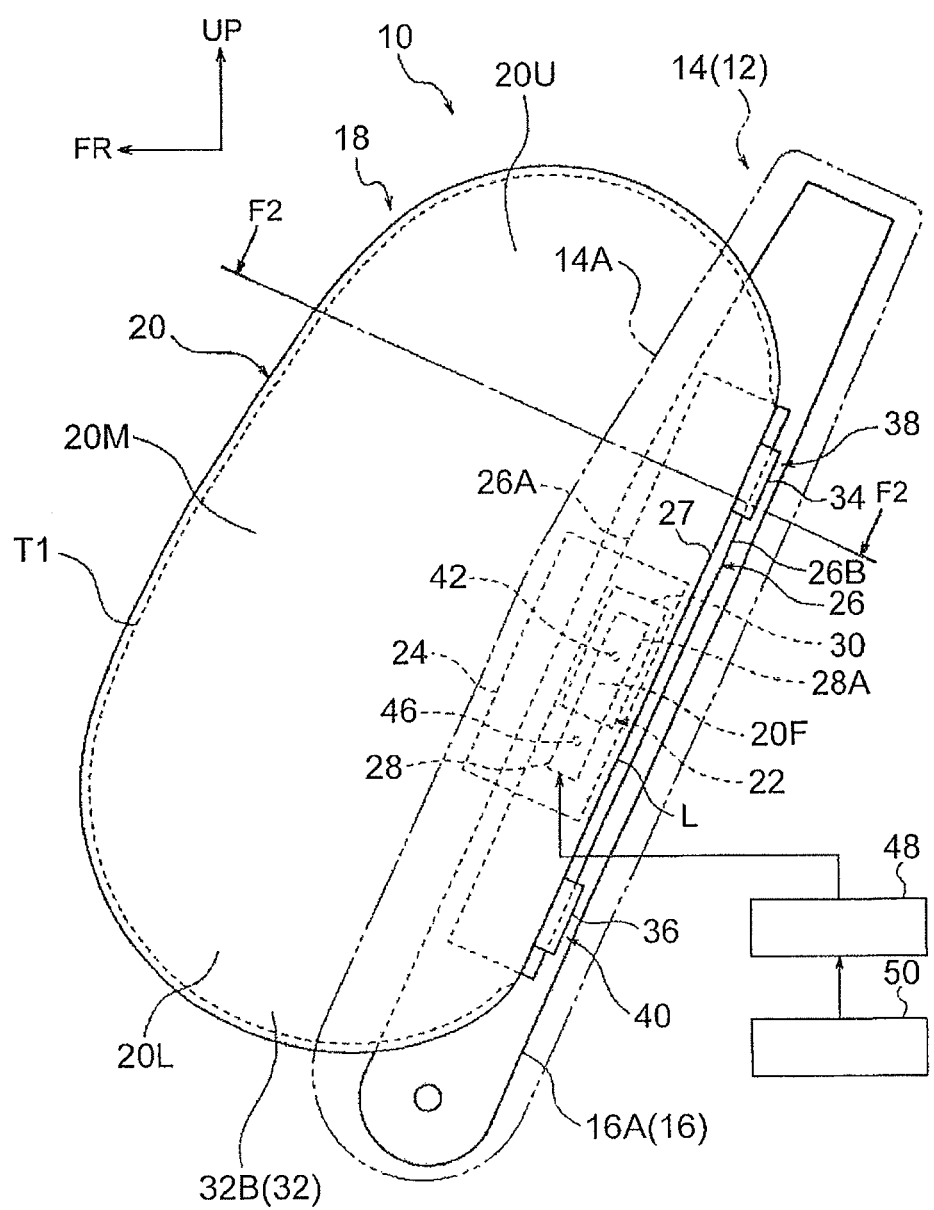
FIG. 1 is a side view illustrating a configuration of a vehicle side air bag device according to a first embodiment of the present invention, and illustrates an expanded unfolded state of an air bag of the side air bag device.

As illustrated in FIG. 1, the side air bag device 10 according to the first embodiment is provided in a door-side side portion 14A (a side portion on the outer side in the vehicle width direction) of a seatback 14 in a vehicle seat 12. A lower end of the seatback 14 is connected to a rear end of a seat cushion (not shown) in a tilting manner, and a headrest (not shown) is connected to an upper end of the seatback 14. Note that, in the present embodiment, a front-rear direction, a right-left direction (width direction), and a vertical direction of the vehicle seat 12 coincide with the front-rear direction, the right-left direction (width direction), and the vertical direction of the vehicle.

The side air bag device 10 is constituted by an air bag 20, a gas generator 22 configured to generate gas in the air bag 20, an inner tube (a rectification cloth) 24 configured to guide the gas generated from the gas generator 22 toward an upper side and a lower side, and a reaction plate 26 as an elongated member, with those members being taken as an essential part. Further, the gas generator 22 is constituted by an inflator 28 configured to be activated to eject gas, and a diffuser 30 configured to rectify the gas ejected from the inflator 28.

The air bag 20 is folded and modularized (unitized) with the inflator 28, etc., and is disposed (housed) in the door-side side portion 14A. Upon receipt of the gas ejected from the inflator 28, the air bag 20 is expanded and unfolded to a vehicle front side of the door-side side portion 14A (between a sitting occupant and a side door (not shown)) (the state illustrated in FIG. 1). At the time when the air bag 20 is expanded and unfolded as such, a seatback pad and a seat skin (not shown) disposed in the door-side side portion 14A are broken by receiving an inflation pressure of the air bag 20. Note that front, rear, upper, and lower directions of the air bag 20 to be described in the following description indicate directions in a state where the air bag 20 is expanded and unfolded, unless otherwise specified, and generally coincide with front, rear, upper, and lower directions of the seatback 14.

Figure 2:
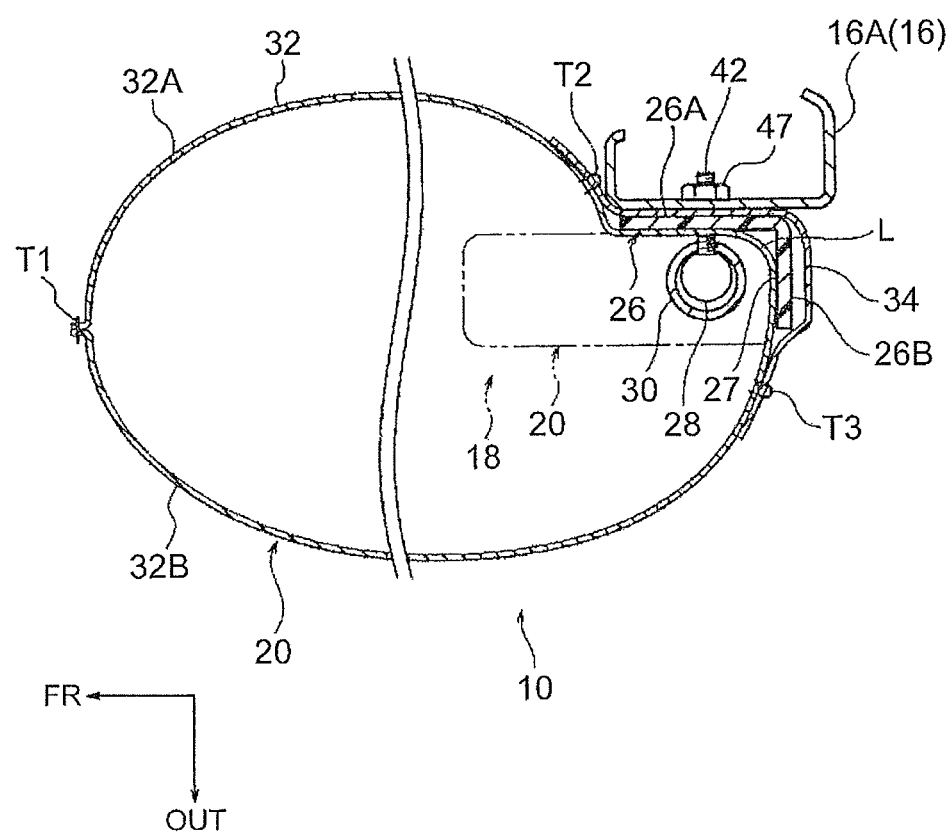
FIG. 2 is an enlarged sectional view illustrating a cut surface along a line F2-F2 in FIG. 1.

As illustrated in FIGS. 1 and 2, the air bag 20 is formed in a sack shape by sewing one base cloth 32 formed by cutting a nylon or polyester fabric material, for example. The base cloth 32 is folded in two along a fold line L to superimpose one side portion 32A on the other side portion 32B via the fold line L, and outer peripheries of them are sewed at a sewing portion T1. Note that the air bag 20 may be formed by sewing outer peripheries of two base cloths superimposed on each other, and a sewing method of the air bag 20 is not limited in particular. Further, in the present embodiment, the air bag 20 is a so-called single chamber air bag. However, the configuration of the air bag is not limited to this, and may be a so-called twin chamber air bag that is partitioned into front and rear sides or up and down sides, for example.

In an expanded unfolded state, the air bag 20 is disposed so that the one side portion 32A of the base cloth 32 faces an inner side (a sitting-occupant side) in the vehicle width direction and the other side portion 32B of the base cloth 32 faces the outer side (a side-door side) in the vehicle width direction. Further, the air bag 20 is formed generally in an oblong shape elongated along a seatback height direction in a side view of the expanded unfolded state as illustrated in FIG. 1, and has a size that can restrain a shoulder, a chest, an abdomen, and a lumbar of the sitting occupant.

More specifically, an upper part 20U of the air bag 20 intervenes between the shoulder of the sitting occupant and the side door, so that the shoulder is restrained by the upper part 20U. Further, a vertically intermediate part 20M (hereinafter just referred to as the "intermediate part 20M") of the air bag 20 intervenes between the chest and the abdomen of the sitting occupant and the side door, so that the chest and the abdomen are restrained by the intermediate part 20M. Further, a lower part 20L of the air bag 20 intervenes between the lumbar of the sitting occupant and the side door, so that the lumbar is restrained by the lower part 20L.

Note that the size of the air bag 20 is set by use of a world side impact dummy (World SID) sitting on the vehicle seat 12. The size of the air bag 20 is not limited to the above, as long as the air bag 20 can restrain at least the shoulder, the chest, and the abdomen of the sitting occupant.

A pair of upper and lower flaps (cloths) 34, 36 are attached to a rear end of the air bag 20. The flaps 34, 36 are made from a fabric material similar to the base cloth 32 in a long belt shape, and are placed outside the air bag 20 in a state where their longitudinal direction is directed toward a direction perpendicular to the fold line L and steps over the fold line L (see FIG. 2). The upper flap 34 is provided on an upper-part-20U side (the upper part 20U or an upper end of the intermediate part 20M) in the rear end of the air bag 20, and is placed at a position distanced upward from the after-mentioned fixed part 20F. One end of the flap 34 in the longitudinal direction is sewed to a rear end of the one side portion 32A of the base cloth 32 at a sewing portion T2, and the other end thereof in the longitudinal direction is sewed to a rear end of the other side portion 32B of the base cloth 32 at a sewing portion T3.

Further, the lower flap 36 is provided on a lower-part-20L side (the lower part 20L or a lower end of the intermediate part 20M) in the rear end of the air bag 20, and is placed at a position distanced downward from the after-mentioned fixed part 20F. Similarly to the flap 34, one end of the flap 36 in the longitudinal direction is sewed to the rear end of the one side portion 32A of the base cloth 32, and the other end thereof in the longitudinal direction is sewed to the rear end of the other side portion 32B of the base cloth 32.

A gap is formed between the base cloth 32 and a longitudinally intermediate part of each of the flaps 34, 36. The upper flap 34 and the base cloth 32 form an upper insertion portion (an insertion portion). 38, and the lower flap 36 and the base cloth 32 form a lower insertion portion (an insertion portion) 40. The upper insertion portion 38 and the lower insertion portion 40 correspond to the after-mentioned reaction plate 26. Note that how to attach the flaps 34, 36 to the base cloth 32 is not limited to sewing, and other methods such as thermal welding and bonding may be usable.

In the meantime, the inflator 28, which is a constituent member of the gas generator 22, is a so-called cylinder inflator, and is formed in a columnar shape. The inflator 28 is disposed inside the air bag 20 in a state where its axis direction is along the height direction of the seatback, and is placed in a rear end of the intermediate part 20M of the air bag 20.

A pair of upper and lower stud bolts 42, 46 (see FIG. 1) project from an outer peripheral part of the inflator 28 toward the inner side in the vehicle width direction. The stud bolts 42, 46 penetrate through the one side portion 32A of the base cloth 32 and a side frame portion 16A of a seatback frame 16, and nuts 47 (see FIG. 2) are engaged threadedly with their tip sides. Hereby, the inflator 28 is fastened and fixed to the side frame portion 16A (so-called side surface fastening) in a state where the fixed part 20F set in a vertically intermediate part of the rear end of the one side portion 32A is sandwiched between the inflator 28 and the side frame portion 16A. That is, the air bag 20 is configured such that the fixed part 20F is fixed to the side frame portion 16A via the inflator 28. Note that part of the diffuser 30 (described later) and part Of an inner tube 24 are placed between the inflator 28 and the fixed part 20F.

A gas ejection portion 28A is provided on an upper end side of the inflator 28. A plurality of gas ports aligned in a circumferential direction of the inflator 28 is formed in the gas ejection portion 28A. When the inflator 28 is activated, gas is ejected radially from the plurality of gas ports.

A side collision ECU 48 provided in the vehicle is electrically connected to the inflator 28, as illustrated in FIG. 1. A side collision sensor 50 configured to detect a side collision is electrically connected to the side collision ECU 48. The side collision ECU 48 is configured to activate the inflator 28 at the time when the side collision ECU 48 detects a side collision (inevitability thereof) based on a signal from the side collision sensor 50. Note that, in a case where a pre-crash sensor that predicts (foresees) a side collision is electrically connected to the side collision ECU 48, the side collision ECU 48 may be configured to activate the inflator 28 at the time when the side collision ECU 48 predicts a side collision based on a signal from the pre-crash sensor.

In the meantime, the diffuser 30 is made of a metallic material, for example, in a cylindrical shape. The diffuser 30 is placed in a state where its axis direction is along the seatback height direction, and an upper side of the inflator 28 is inserted thereinside. The upper stud bolt 42 of the inflator 28 penetrates through the diffuser 30, and part of the diffuser 30 is sandwiched between the inflator 28 and the fixed part 20F of the air bag 20. Hereby, the diffuser 30 is fixed to the side frame portion 16A via the inflator 28. Note that part of the after-mentioned inner tube 24 is placed between the diffuser 30 and the fixed part 20F. The diffuser 30 covers the gas ejection portion 28A of the inflator 28, and is configured to eject the gas ejected from the gas ejection portion 28A from upper and lower openings toward the upper side and the lower side.

In the meantime, the inner tube 24 (see FIG. 1: not shown in FIG. 2) is formed by sewing a fabric material similar to the base cloth 32 of the air bag 20 in a tubular shape, and upper and lower ends thereof are opened. The inner tube 24 is provided in the air bag 20 in a state where the inner tube 24 covers the inflator 28 and the diffuser 30, and is placed in the rear end of the intermediate part 20M of the air bag 20. The upper and lower stud bolts 42, 46 of the inflator 28 penetrate through the inner tube 24, and part of the inner tube 24 is sandwiched between the inflator 28 and the fixed part 20F of the air bag 20. Hereby, the inner tube 24 is fixed to the side frame portion 16A via the inflator 28. Note that part of the diffuser 30 is placed between an upper part of the inflator 28 and the inner tube 24. The inner tube 24 has a function to guide the gas ejected from the upper and lower openings of the diffuser 30 toward the upper side and the lower side inside the air bag 20.

Meanwhile, the reaction plate 26 is made of a resin material in an elongated shape, and is disposed inside the door-side side portion 14A in a state where its longitudinal direction is along the height direction of the seatback 14. The reaction plate 26 includes a plate-shaped mounting portion 26A superimposed on an outer side surface of the side frame portion 16A in the vehicle width direction, and a plate-shaped reaction force receiving portion 26B extending from a rear end of the mounting portion 26A to the outer side in the vehicle width direction. The reaction plate 26 is formed to have an L-shaped section when viewed from the height direction of the seatback 14. Note that the material of the reaction plate 26 is not limited to the resin, and may be other materials such as a sheet metal.

The air bag 20 in a folded state (see an alternate long and two short dashes line in FIG. 2) is placed on an outer side of the mounting portion 26A in the vehicle width direction and on a vehicle front side of the reaction force receiving portion 26B. The upper and lower stud bolts 42, 46 included in the inflator 28 (see FIG. 1) accommodated in the air bag 20 in the folded state penetrate through the inner tube 24, the fixed part 20F, the mounting portion 26A, and the side frame portion 16A, and are engaged threadedly with the nuts 47 (see FIG. 2) provided on an inner side of the side frame portion in the vehicle width direction. Hereby, the mounting portion 26A, that is, a longitudinally intermediate part of the reaction plate 26 is fixed to the side frame portion 16A via the inflator 28.

Further, the reaction force receiving portion 26B is placed so as to abut with or face the rear end of the air bag 20 in the folded state. A vehicle front side surface of the reaction force receiving portion 26B serves as a reaction force surface 27 that receives a reaction force of the unfolding of the air bag 20 (or supports the air bag 20 from a vehicle rear side) at the time when the air bag 20 is expanded and unfolded.

The reaction plate 26 extends toward an upper side relative to the inner tube 24, an upper end thereof is inserted into the upper insertion portion 38 of the air bag 20 from its lower side. That is, the upper end of the reaction plate 26 is passed between the upper flap 34 and the base cloth 32 from the lower side (see FIG. 2). Hereby, the upper part 20U of the air bag 20 is locked (restrained) by the reaction plate 26.

Further, the reaction plate 26 extends toward a lower side relative to the inner tube 24, and a lower end thereof is inserted into the lower insertion portion 40 of the air bag 20 from its upper side. That is, the lower end of the reaction plate 26 is passed between the lower flap 36 and the base cloth 32 from the upper side. Hereby, the lower part 20L of the air bag 20 is locked (restrained) by the reaction plate 26.

When the side air bag device 10 thus configured is manufactured, the stud bolt 42 of the inflator 28 is first passed through a through hole (not shown) formed in the diffuser 30, so that the diffuser 30 is attached to the inflator 28. Subsequently, the inflator 28 and the diffuser 30 (that is, the gas generator 22) are inserted into the inner tube 24, and the stud bolts 42, 46 of the inflator 28 are passed through a pair of through holes (not shown) formed in the inner tube 24.

Then, the inflator 28, the diffuser 30, and the inner tube 24 are inserted into the air bag 20 from a slit (not shown) formed in the fixed part 20F of the air bag 20, and the stud bolts 42, 46 of the inflator 28 are passed through a pair of through holes (not shown) formed in the fixed part 20F. Subsequently, the upper end and the lower end of the reaction plate 26 are inserted into the upper insertion portion 38 and the lower insertion portion 40 of the air bag 20, respectively, and the stud bolts 42, 46 of the inflator 28 are passed through a pair of through holes (not shown) formed in the mounting portion 26A of the reaction plate 26.

Subsequently, the air bag 20 is folded. At the time of the folding, an upper end side of the upper part 20U relative to the flap 34 is first folded toward the lower part 20L so as to be superimposed on the outer side of the intermediate part 20M in the vehicle width direction, and a lower end side of the lower part 20L relative to the flap 36 is folded toward the upper part 20U so as to be superimposed on the outer side of the intermediate part 20M in the vehicle width direction. Subsequently, the air bag 20 is folded from a front end side toward a rear end side in a predetermined folding manner (a rolling manner, a bellows manner, or the like), and the air bag 20 thus folded is covered with a wrapping material (not shown) that easily breaks by an inflation pressure of the air bag 20. Hereby, an air bag module 18 constituted by modularizing the air bag 20, the inflator 28, the diffuser 30, the inner tube 24, and the reaction plate 26 is completed.

Then, the air bag module 18 is attached to the side frame portion 16A of the seatback frame 16. At the time of the attachment, the mounting portion 26A of the reaction plate 26 is superimposed on the outer side surface of the side frame portion 16A in the vehicle width direction, and the stud bolts 42, 46 projecting inwardly in the vehicle width direction from the mounting portion 26A are passed through a pair of through holes (not shown) formed in the side frame portion 16A. Then, the nuts 47 are engaged threadedly with the stud bolts 42, 46 from an inner side of the side frame portion 16A in the vehicle width direction. Hereby, the air bag module 18 is fastened and fixed to the side frame portion 16A. In this state, the slit formed in the fixed part 20F of the air bag 20 is closed between the inner tube 24 and the mounting portion 26A.

Operations and Effects

Next will be described operations and effects of the first embodiment.

In the side air bag device 10 thus configured, the air bag 20 in the folded state, the gas generator 22, the reaction plate 26, and so on are fixed to the side frame portion 16A of the seatback frame 16 inside the door-side side portion 14A of the seatback 14. The upper insertion portion 38 into which the upper end of the reaction plate 26 is inserted is formed on the upper-part-20U side in the rear end of the air bag 20, and the lower insertion portion 40 into which the lower end of the reaction plate 26 is inserted is formed on the lower-part-20L side in the rear end of the air bag 20. The upper insertion portion 38 is formed on the upper side relative to the fixed part 20F of the air bag 20 with respect to the side frame portion 16A, and the lower insertion portion 40 is formed on the lower side relative to the fixed part 20F.

Here, when the gas is ejected from the inflator 28 of the gas generator 22, the air bag 20 is expanded and unfolded toward the vehicle front side of the door-side side portion 14A. At this time, not only the fixed part 20F is supported by the side frame portion 16A, but also the upper insertion portion 38 is supported by the reaction plate 26 on the upper side relative to the fixed part 20F and the lower insertion portion 40 is supported by the reaction plate 26 on the lower side relative to the fixed part 20F. Thus, the air bag 20 is supported at three points, i.e., the fixed part 20F, the upper insertion portion 38, and the lower insertion portion 40, so that flapping of the air bag 20 can be suppressed effectively.

Figure 3A:
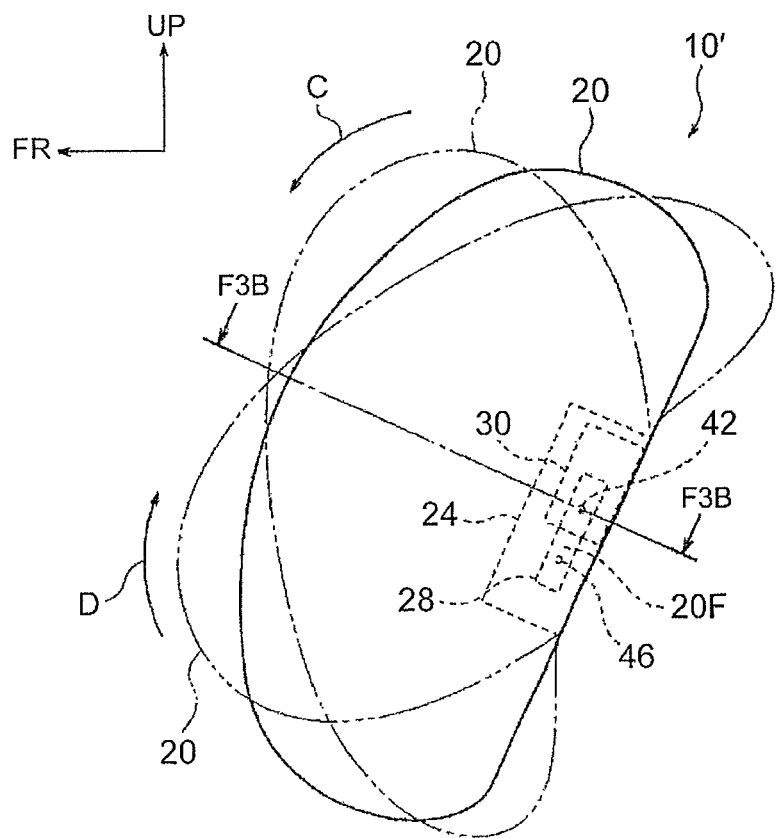
FIG. 3(A) is a side view to describe a state where an air bag in a comparative example of the first embodiment flaps at the time when the air bag is expanded and unfolded.
Figure 3B:
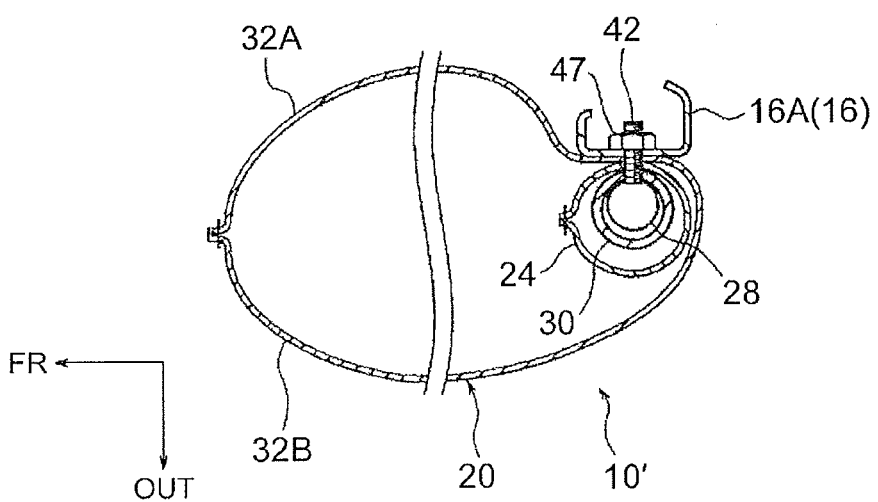
FIG. 3(B) is an enlarged sectional view illustrating a cut surface along a line F3B-F3B in FIG. 3(A).

That is, like a comparative example 10' illustrated in FIG. 3(A) and FIG. 3(B), in a configuration in which a large-sized air bag 20 is provided, but no reaction plate 26 is provided, at the time when the air bag 20 is expanded and unfolded, the air bag 20 may rotate unexpectedly in a direction of an arrow C (a counterclockwise direction when viewed from the outer side in the vehicle width direction) or in a direction of an arrow D (a clockwise direction when viewed from the outer side in the vehicle width direction) in FIG. 3(A). This is because distances from a fixed part 20F to an upper end and a lower end of the air bag 20 are long, and it is very difficult to stabilize the expansion behavior of the air bag 20. In this regard, in the present embodiment, since the air bag 20 is restrained by the reaction plate 26 at the upper insertion portion 38 and the lower insertion portion 40 distanced upward and downward from the fixed part 20F, it is possible to effectively prevent or suppress an unexpected rotation like the rotation described above. Note that, in FIG. 3(A) and FIG. 3(B), the same reference sign is given to the same constituent of the present embodiment.

Besides, in the present embodiment, when the air bag 20 is fixed to the side frame portion 16A, the air bag 20, the gas generator 22, and the reaction plate 26 can be modularized in a state where the reaction plate 26 is inserted into the upper insertion portion 38 and the lower insertion portion 40 in advance. Further, when this module (the air bag module 18) is fixed to the side frame portion 16A, a fixing operation of the fixed part 20F (an operation of threadedly engaging the nuts 47 with the stud bolts 42, 46 to fasten the stud bolts 42, 46) is just performed. Because of this, even in a state where the seatback frame 16 is covered with a seat pad and the like, the fixing operation (an attachment operation) is easily performed. This makes it possible to improve a degree of freedom of an attachment procedure of components to the side frame portion 16A.

Further, in the present embodiment, when the reaction plate 26 is attached to the air bag 20, the reaction plate 26 is just inserted into the upper insertion portion 38 and the lower insertion portion 40, so that it is possible to simplify the attachment operation of the reaction plate 26 to the air bag 20.

Further, in the present embodiment, the upper insertion portion 38 and the lower insertion portion 40 are formed by attaching the flaps 34, 36 to the base cloth 32 constituting the air bag 20, so that the configuration of the insertion portions can be simplified. Further, a configuration in which a slit or the like is formed in the base cloth 32 so as to serve as an insertion portion requires a treatment to prevent gas leakage from the slit, but the present embodiment does not require such a gas leakage prevention treatment, which is preferable.

Further, in the present embodiment, the mounting portion 26A of the reaction plate 26 is superimposed on the outer side surface of the side frame portion 16A in the vehicle width direction. The stud bolts 42, 46 of the gas generator 22 accommodated in the air bag 20 in the folded state penetrate through the inner tube 24, the fixed part 20F, the mounting portion 26A, and the side frame portion 16A, so as to be engaged threadedly with the nuts 47. Hereby, the air bag module 18 including the reaction plate 26 can be fixed to the side frame portion 16A by so-called side surface fastening.

Further, the reaction plate 26 includes the reaction force receiving portion 26B extending outwardly in the vehicle width direction from the mounting portion 26A, and the reaction force receiving portion 26B is placed on a vehicle rear side of the air bag 20 in the folded state. The vehicle front side surface of the reaction force receiving portion 26B serves as the reaction force surface 27. The reaction force surface 27 is elongated along the height direction of the seatback, so that a reaction force of the unfolding of the air bag 20 can be supported in a wide range in the up-down direction. As a result, the air bag 20 can be unfolded at an early stage, and flapping of the air bag 20 can be suppressed more effectively.

Supplementary Description of First Embodiment

Note that the first embodiment has such a configuration that the stud bolts 42, 46 are provided in the inflator 28. However, the present invention is not limited to this, and may be configured such that an inflator is fixed to a diffuser provided with stud bolts.

Further, the first embodiment is configured such that the upper insertion portion 38 and the lower insertion portion 40 (each of which is an insertion portion) are formed by attaching the flaps (cloths) 34, 36 to the base cloth 32 constituting the air bag 20. However, the present invention is not limited to this, and an insertion portion may be formed by forming a slit in part of a base cloth constituting an air bag. In that case, it is necessary to perform gas leakage prevention measures to close the slit by an inflation pressure of the air bag, for example.

Further, the first embodiment is configured such that the reaction plate 26 (an elongated member) is passed through the upper insertion portion 38 and the lower insertion portion 40 (each of which is an insertion portion). However, the present invention is not limited to this, and may be configured such that an end of an elongated member is inserted into an insertion portion.

Further, the first embodiment is configured such that the reaction plate 26 including the mounting portion 26A and the reaction force receiving portion 26B is an elongated member. However, the present invention is not limited to this, and may be configured such that the elongated member may be a simple stick member. Even in that case, flapping of the air bag can be restrained. The above supplementary description applies to the following second embodiment of the present invention.

Second Embodiment

Next will be described a second embodiment of the present invention. Note that basically the same configuration/operation as the configuration/operation of the first embodiment has the same reference sign as in the first embodiment, and its description is omitted.

Figure 4:
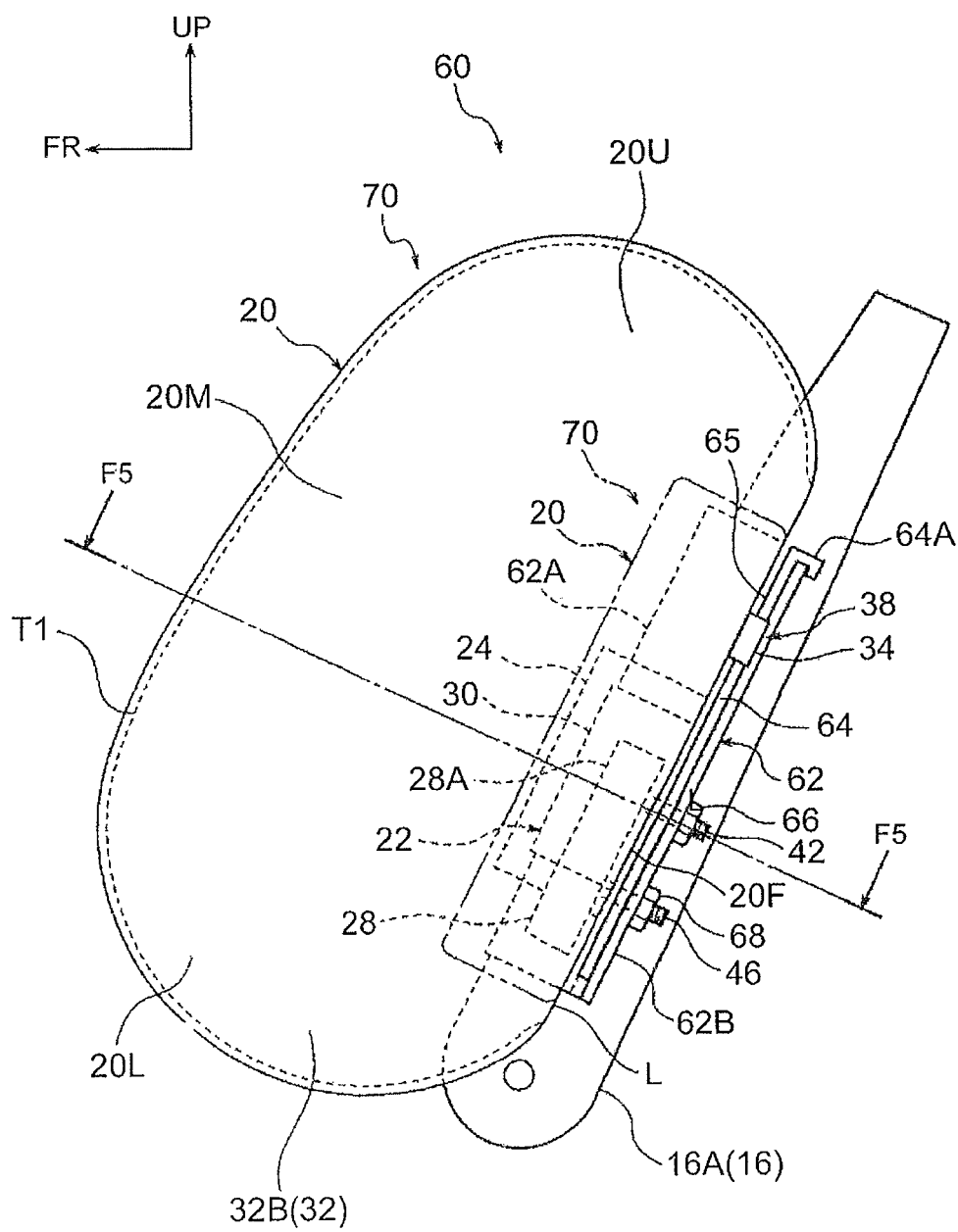
FIG. 4 is a side view illustrating a configuration of a vehicle side air bag device according to a second embodiment of the present invention, and illustrates a state where an air bag of the side air bag device is expanded and unfolded.
Figure 5:
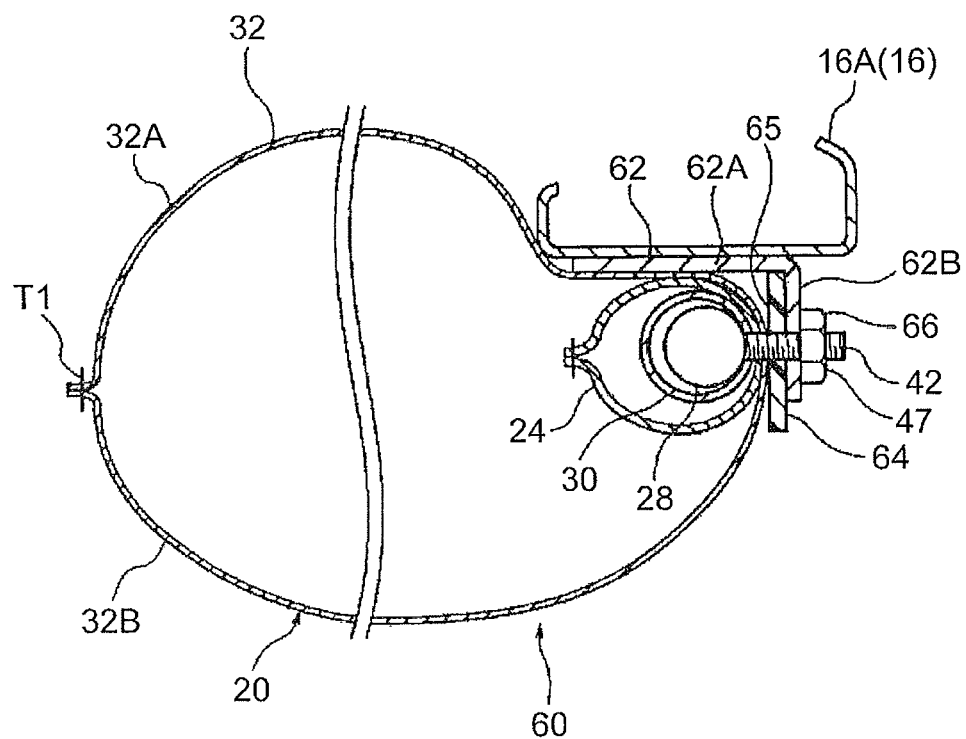
FIG. 5 is an enlarged sectional view illustrating a cut surface along a line F5-F5 in FIG. 4.

FIG. 4 is a side view illustrating a configuration of an essential part of a vehicle side air bag device 60 according to the second embodiment of the present invention. Further, FIG. 5 is an enlarged sectional view illustrating a cut surface along a line F5-F5 in FIG. 4. The present embodiment is different from the first embodiment in the following point. In the present embodiment, a bracket 62 is provided on an outer side, in the vehicle width direction, of a vertically intermediate part of a side frame portion 16A of a seatback frame 16. The bracket 62 is made of a sheet metal material, for example, in an elongated shape, and is placed in a state where its longitudinal direction is along a height direction of a seatback 14. The bracket 62 is constituted by a plate-shaped base portion 62A fixed to an outer side surface of the side frame portion 16A in the vehicle width direction by means of welding or the like, and a plate-shaped support portion 62B extending outwardly in the vehicle width direction from a rear end of the base portion 62A.

A reaction plate 64 as an elongated member is placed on a vehicle front side of the support portion 62B. The reaction plate 64 is made of a resin material, for example, in an elongated flat shape, and is superimposed on a vehicle front side surface of the support portion 62B in a state where its longitudinal direction is along the height direction of the seatback 14. A vehicle front side surface (a surface opposite to the support portion 62B) of the reaction plate 64 serves as a reaction force surface 65. An upper end of the reaction plate 64 is provided with a temporal tacking hook 64A as a temporal tacking portion in an integrated manner. The temporal tacking hook 64A extends from the upper end of the reaction plate 64 toward a rear side of the seatback 14, and an intermediate part thereof is bent such that a tip side thereof extends toward a lower end side of the seatback 14, so that the tip side is formed in a reverse L shape when viewed from the vehicle width direction. The temporal tacking hook 64A is hooked over an upper end of the support portion 62B of the bracket 62.

An air bag 20 in a folded state (see an alternate long and two short dashes line in FIG. 4) is placed on the vehicle front side of the reaction plate 64. The air bag 20 does not include the lower insertion portion 40 according to the first embodiment, and only includes an upper insertion portion 38. Similarly to the first embodiment, an upper end of the reaction plate 64 is inserted into the upper insertion portion 38 from its lower side.

Similarly to the first embodiment, an inflator 28, a diffuser 30, and an inner tube 24 are accommodated in the air bag 20. A pair of upper and lower stud bolts 42, 46 provided in the inflator 28 penetrates through a rear end of a base cloth 32 of the air bag 20 and also penetrate through the reaction plate 64 and the support portion 62B, so as to be engaged threadedly with a pair of upper and lower nuts 66, 68 provided on a back side (a vehicle rear side) of the support portion 62B. Hereby, an air bag module 70 constituted by the air bag 20, the inflator 28, the diffuser 30, the inner tube 24, and the reaction plate 64 are fixed to the side frame portion 16A via the bracket 62 by so-called back surface fastening. Note that, in the present embodiment, the inflator 28 is placed closer to a lower end side of the side frame portion 16A than in the first embodiment. The other configuration is basically the same as the configuration of the first embodiment.

In the present embodiment, at the time when the air bag 20 is expanded and unfolded, not only the fixed part 20F is supported by the side frame portion 16A, but also the upper insertion portion 38 is supported by the reaction plate 64 on the upper side relative to the fixed part 20F. Thus, the air bag 20 is supported at two points, i.e., the fixed part 20F and the upper insertion portion 38, so that flapping of the air bag 20 can be suppressed.

Further, in the present embodiment, since the reaction plate 64 is placed on the vehicle rear side of the air bag 20 in the folded state, a reaction force of the unfolding of the air bag 20 can be successfully supported by the reaction force surface 65, which is the vehicle front side surface of the reaction plate 64, so that the air bag 20 can be unfolded at an early stage.

Further, in the present embodiment, the air bag module 70 can be fixed to the side frame portion 16A by so-called back surface fastening. In view of this, for example, in a case where a stay cloth (a belt-shaped member to transmit an inflation pressure of the air bag 20 to a sewing portion) is provided over between that sewing portion of a seat skin which is set in a front edge of a door-side side portion 14A and the stud bolts 42, 46, a routing path of the stay cloth can be set short, which is preferable.

Further, in the present embodiment, when the air bag module 70 is fixed to the side frame portion 16A, the temporal tacking hook 64A provided in the reaction plate 64 is engaged with the upper end of the bracket 62, so that the reaction plate 64, namely, the air bag module 70 can be temporarily tacked to the bracket 62. This makes it possible to simplify an operation of back surface fastening performed after that.

Supplementary Description of Second Embodiment

Figure 6:
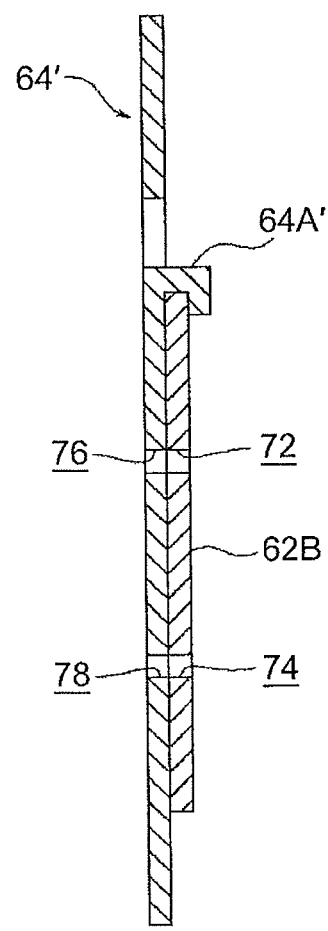
FIG. 6 is a longitudinal sectional view illustrating a modification of a reaction plate in the second embodiment.

The second embodiment is configured such that the temporal tacking hook 64A is formed in the upper end of the reaction plate 64. However, the present invention is not limited to this, and may be configured such that a temporal tacking hook 64A' is formed in a vertically intermediate part of a reaction plate 64' like a modification illustrated in FIG. 6. Note that the reaction plate 64' is made of a sheet metal material, and part of the reaction plate 64' is cut and raised to form the temporal tacking hook 64A'. Further, reference signs 72, 74, 76, 78 in FIG. 6 indicate holes through which stud bolts 42, 46 passed.

Further, the second embodiment is configured such that the temporal tacking hook 64A as a temporal tacking portion has a section in a reverse L shape. However, the present invention is not limited to this, and the shape of the temporal tacking portion can be changed freely, provided that the temporal tacking portion can temporarily tack (hold) a reaction plate (an elongated member) to a bracket by being engaged with the bracket. Further, a temporal tacking portion may be provided in the reaction plate 26 in the first embodiment, so that the temporal tacking portion is engaged with the side frame portion 16A so as to temporarily tack the reaction plate 26 to the side frame portion 16A.

Note that the entirety of the disclosure of Japanese Patent Application No. 2012-162721 is incorporated herein by reference. Further, all the documents, patent applications, and technical standards described in the present specification are hereby incorporated herein by reference to the same extent as in cases where each document, patent application or technical standard is specifically and individually described as being incorporated by reference.

In addition, the present invention can be performed with various modifications without departing from a gist of the present invention. Further, it is needless to say that a scope of the present invention is not limited to each of the above embodiments.

The invention claimed is:

1. A vehicle side air bag device comprising:
   a gas generator disposed in a side portion on an outer side, in a vehicle width direction, of a seatback of a vehicle seat and configured to be activated to generate gas for expansion and unfolding;
   an elongated member disposed in the side portion in a state where its longitudinal direction is along a height direction of the seat bag; and
   an air bag disposed in a folded state in the side portion and fixed to a side frame portion of a seatback frame together with the gas generator and the elongated member, the air bag being expanded and unfolded toward a vehicle front side of the side portion when the gas is supplied there-inside,
   wherein:
      the elongated member is attached to an outer surface of the air bag, the air bag including an insertion portion provided on an upper side relative to a fixed part to the side frame portion and configured such that the elongated member is inserted therein, and
      the insert portion is configured to fix the air bag to the side frame portion by fixing the elongated member to the air bag when the gas is supplied inside the air bag,
   wherein:
   the insertion portion is formed by attaching a cloth to a base cloth constituting the air bag, and
   the elongated member is inserted between the base cloth and the cloth.

2. The vehicle side air bag device according to claim 1, wherein:
   the air bag includes an insertion portion provided on a lower side relative to the fixed part to the side frame portion and configured such that the elongated member is inserted therein.

3. A vehicle side air bag device comprising:
   a gas generator disposed in a side portion on an outer side, in a vehicle width direction, of a seatback of a vehicle seat and configured to be activated to generate gas for expansion and unfolding;
   an elongated member disposed in the side portion in a state where its longitudinal direction is along a height direction of the seatback; and
   an air bag disposed in a folded state in the side portion and fixed to a side frame portion of a seatback frame together with the gas generator and the elongated member, the air bag being expanded and unfolded toward a vehicle front side of the side portion when the gas is supplied there-inside, the air bag including an insertion portion provided on an upper side relative to a fixed part to the side frame portion and configured such that the elongated member is inserted therein,
   wherein:
      the insertion portion is formed by attaching a cloth to a base cloth constituting the air bag, and
      the elongated member is inserted between the base cloth and the cloth.

4. The vehicle side air bag device according to claim 1, wherein:
   the elongated member has a reaction force surface facing a seat front side, so as to support the air bag from a seat rear side by the reaction force surface at the time when the air bag is expanded and unfolded.

5. A vehicle side air bag device, comprising:
   a gas generator disposed in a side portion on an outer side, in a vehicle width direction, of a seatback of a vehicle seat and configured to be activated to generate gas for expansion and unfolding;
   an elongated member disposed in the side portion in a state where its longitudinal direction is along a height direction of the seatback; and
   an air bag disposed in a folded state in the side portion and fixed to a side frame portion of a seatback frame together with the gas generator and the elongated member, the air bag being expanded and unfolded toward a vehicle front side of the side portion when the gas is supplied there-inside, the air bag including an insertion portion provided on an upper side relative to a fixed part to the side frame portion and configured such that the elongated member is inserted therein,
   wherein:
      the elongated member has a reaction force surface facing a seat front side, so as to support the air bag from a seat rear side by the reaction force surface at the time when the air bag is expanded and unfolded,
      the elongated member includes a mounting portion superimposed on an outer side surface of the side frame portion in the vehicle width direction, and a reaction force receiving portion extending outwardly in the vehicle width direction from the mounting portion,
      the gas generator is accommodated in the air bag in the folded state in which the air bag is placed on an outer side of the mounting portion in the vehicle width direction and on a vehicle front side of the reaction force receiving portion, and
      a stud bolt included in the gas generator penetrates through the air bag, the mounting portion, and the side frame portion so as to be engaged threadedly with a nut.

6. The vehicle side air bag device according to claim 4, further comprising:

a bracket fixed to the side frame portion and extending toward an outer side in the vehicle width direction relative to the side frame portion, wherein:

the elongated member is superimposed on a vehicle front side surface of the bracket, the gas generator is accommodated in the air bag in the folded state in which the air bag is placed on a vehicle front side of the elongated member, and a stud bolt included in the gas generator penetrates through the air bag, the elongated member, and the bracket so as to be engaged threadedly with a nut.

7. The vehicle side air bag device according to claim 5, wherein:

the elongated member is temporarily tacked to the side frame portion such that a temporal tacking portion provided in the elongated member is engaged with the side frame portion.

8. The vehicle side air bag device according to claim 6, wherein:

the elongated member is temporarily tacked to the side frame portion or the bracket such that a temporal tacking portion provided in the elongated member is engaged with the side frame portion or the bracket.

* * * * *